United States Patent [19]

Olsson

[11] 4,165,567
[45] Aug. 28, 1979

[54] CHECKING AND MEASUREMENT DEVICE FOR AUTOMOBILE CHASSIS

[75] Inventor: Conny E. Olsson, Trangsund, Sweden

[73] Assignee: Bilskadecenter I Stockholm AB, Trangsund, Sweden

[21] Appl. No.: 851,923

[22] Filed: Nov. 16, 1977

[30] Foreign Application Priority Data

Nov. 23, 1976 [SE] Sweden ............................. 7613070

[51] Int. Cl.² .............................................. G01B 5/25
[52] U.S. Cl. ................................. 33/288; 33/180 AT
[58] Field of Search ........... 33/288, 180 AT, 181 AT, 33/185 V, 174 G

[56] References Cited

U.S. PATENT DOCUMENTS

| | | | |
|---|---|---|---|
| 1,135,089 | 4/1915 | Wilks | 33/174 G |
| 2,000,866 | 5/1935 | Smith | 33/288 |
| 3,057,074 | 10/1962 | Sidwell | 33/288 |
| 3,611,575 | 10/1971 | Chartier | 33/288 |
| 3,869,804 | 3/1975 | Friend | 33/288 |
| 4,055,061 | 10/1977 | Bayorgeon et al. | 33/288 |

Primary Examiner—Charles E. Phillips
Assistant Examiner—John W. Shepperd
Attorney, Agent, or Firm—Edwin E. Greigg

[57] ABSTRACT

The disclosure relates to the automotive art in general and in particular to a checking and measurement device for an automobile chassis, comprising measurement scale carriers which are adjustable in correspondence with the spatial position of measurement points in a vehicle chassis. Each one of the measurement scale carriers consists of a transverse arm disposed for measuring in the transverse direction of the chassis, the arms having, at each end portion, a guide for a releasable measurement rod which may be connected to each respective arm end portion for measuring in the vertical direction of the chassis and is of adjustable length, which has means for pivotal suspension of the measurement rod in a chassis measurement point and means for adjusting the measurement rod in the transverse direction of the arm for measuring in the transverse direction of the chassis. The checking and measurement device is suspendable by means of these measurement rods in its entirety in measurement points in the chassis and is furnished with a device for measuring in the longitudinal direction of the chassis.

5 Claims, 6 Drawing Figures

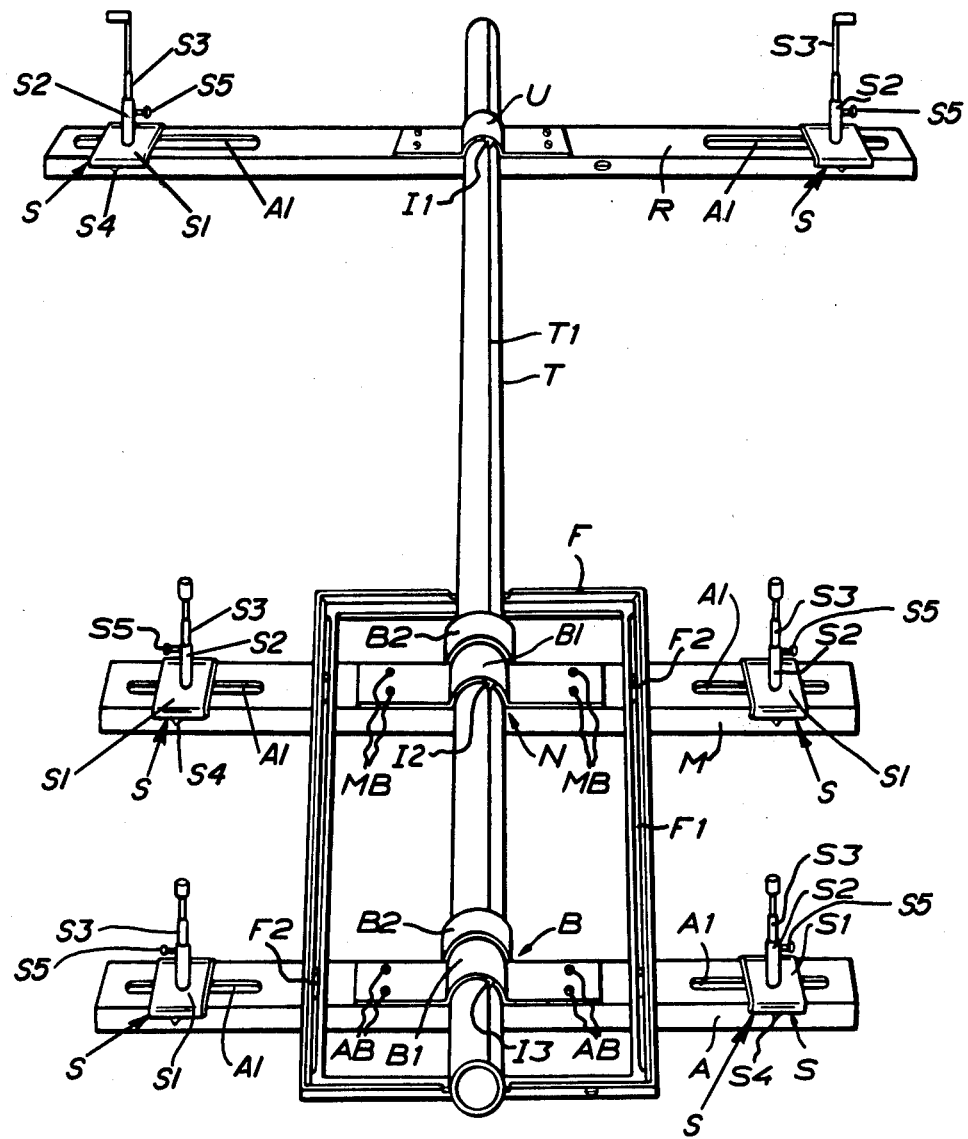

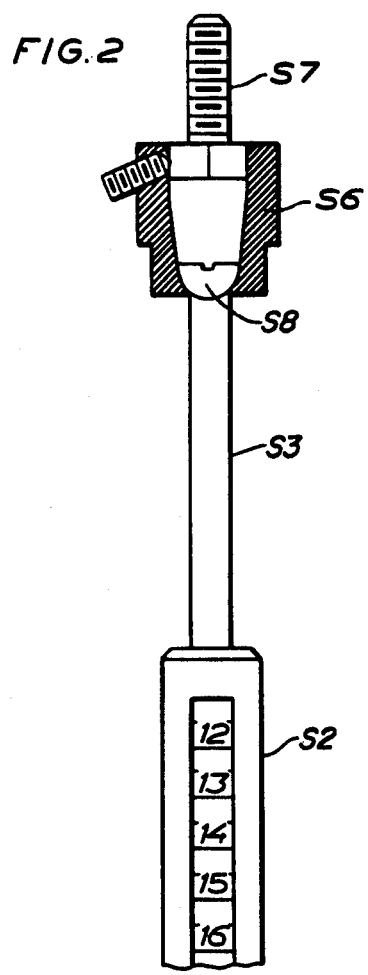

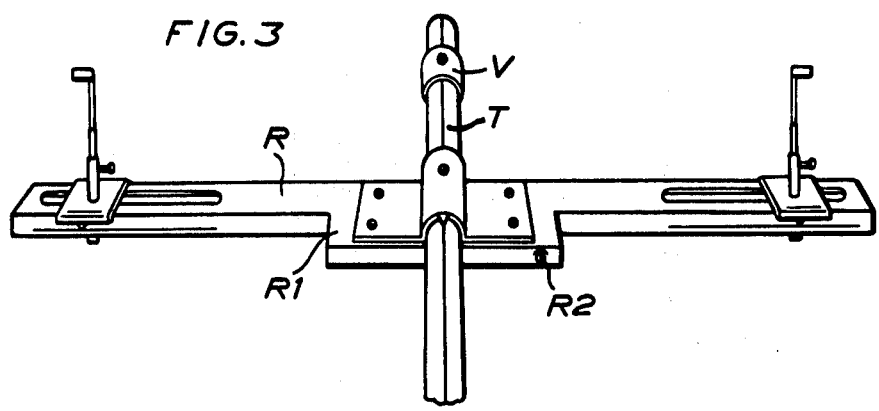
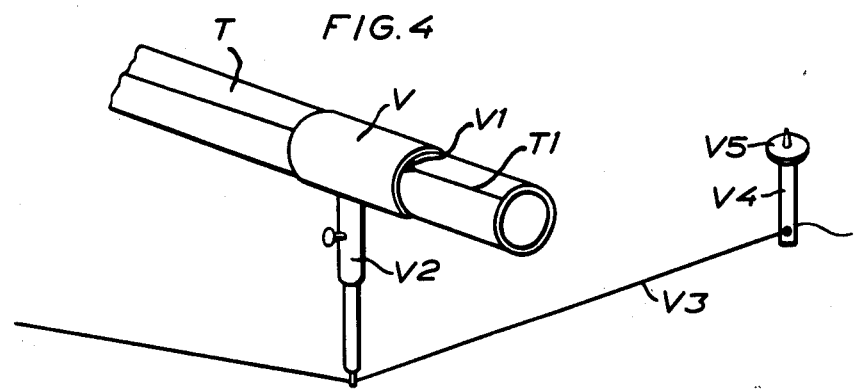
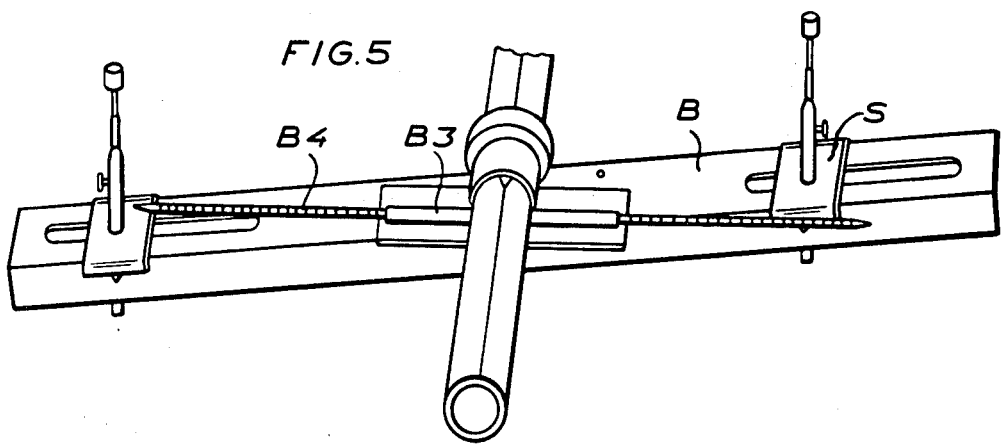

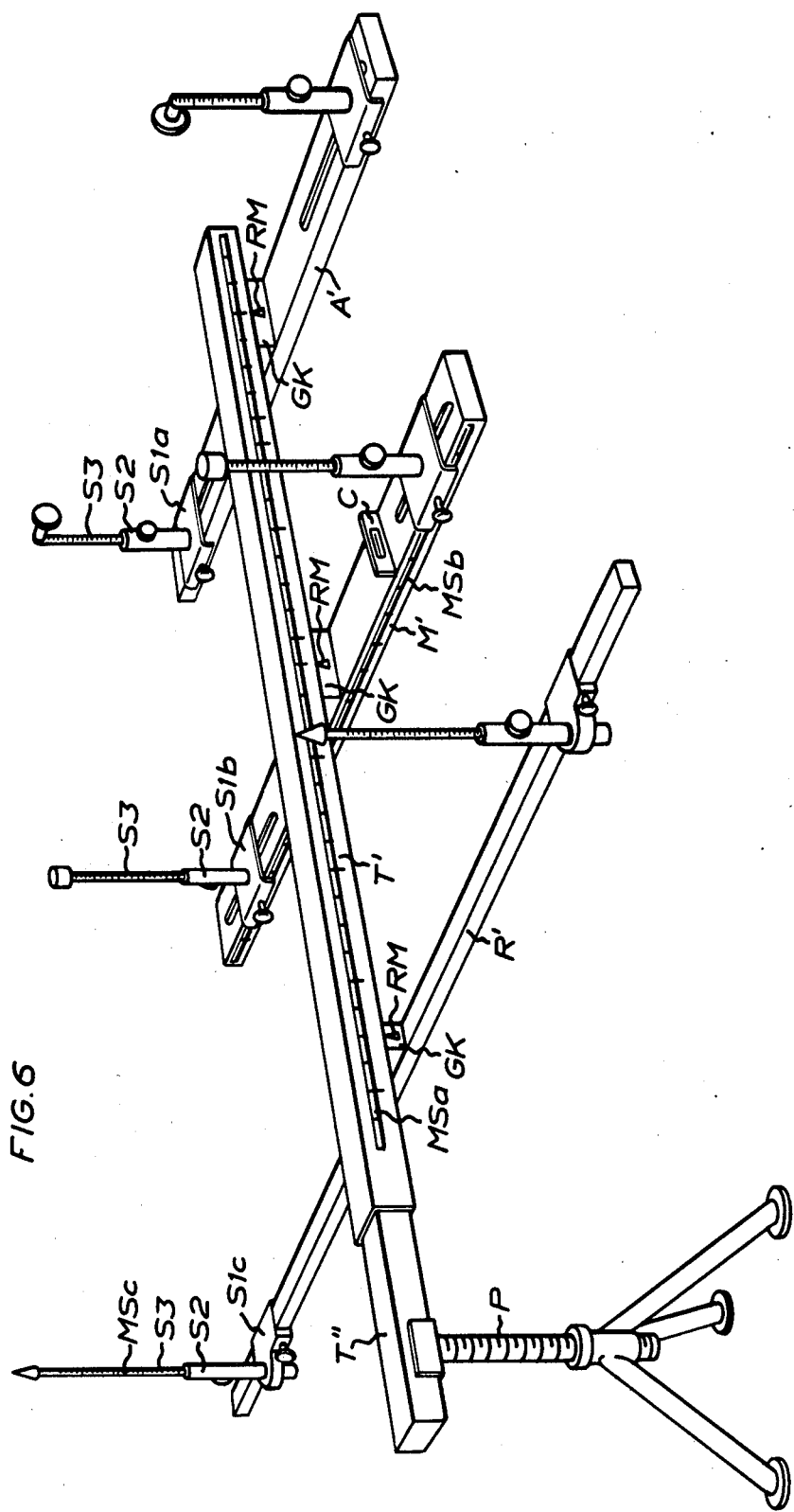

CHECKING AND MEASUREMENT DEVICE FOR AUTOMOBILE CHASSIS

The present invention relates to a checking and measurement device for automobile chassis which comprises an elongate support and at least two transverse measurement scale carriers the measurement scale carriers being supported by the elongate support and being movable and adjustable in relation to each other in the longitudinal axis (x-direction) in the longitudinal direction of the support for measurement in correspondence with the spatial position of measurement points in a chassis.

It is a particular requirement in automobile chassis that the points of the chassis where the suspension is anchored must satisfy measurement relationships accurately determined by the manufacturer, in order that the driving and road-holding properties of the vehicle be those which are contemplated and desirable. It is, therefore, important that aids be available for checking these measurement relationships, it being possibly necessary to carry out such testing in conjunction with the repair of automobiles which have been damaged in traffic and in the event of examination of automobiles in which there is reason to suspect that repairs have been effected in such a manner that the above-mentioned measurement relationships have not been reset to their correct values.

There are a number of aids available for these purposes. In general, these aids are of the type which, in conjunction with checking and measurement of chassis points in damaged chassis, also carry out straightening operations with the aid of hydraulic devices. Such apparatuses are expensive and are beyond the reach of small automobile workshops which, however, need, under any circumstances, reliable and easily manoeuvrable aids for checking and measurement in conjunction with repair. Stations for exclusively testing and inspecting vehicles also need such aids which replace both older, circumstantial and uncertain measurement arrangements as well as detailed and complicated measurement systems based on, for example, laser technique.

The problem in realizing a device of uncomplicated nature and at a relatively low price by means of which checking and measurement of chassis points can be carried out in a reliable and rapid manner has been solved by the present invention, according to which at least two transverse measurement scale carriers (A, M, R) each comprise transversely movable measurement means for measurement in the transverse direction of the chassis (y-direction) and vertically adjustable measurement means supported by the transversely movable measurement means for measurement in the vertical direction of the chassis (the z-direction), said vertically adjustable measurement means comprising pivot means pivotally connectable each to one of the measurement points of the chassis for supporting said measurement means and said elongate support in a suspended position under the chassis.

The invention will be described in greater detail hereinbelow with reference to the accompanying drawings, in which:

FIG. 1 is a schematic view of a checking and measurement device according to the invention in the form of a bridge suspendable on the underside of a vehicle chassis;

FIG. 2 shows, in more detail, an adjustable measurement rod in the checking and measurement bridge of FIG. 1;

FIG. 3 shows a modification of the rear portion of the central frame tube and the rear measurement beam of FIG. 1;

FIG. 4 shows an auxiliary device which may be used in conjunction with the checking and measurement bridge of FIG. 1;

FIG. 5 shows a measurement beam with an optional auxiliary device; and

FIG. 6 is a perspective view of a modified checking and measurement bridge according to the invention.

FIG. 1 shows the major parts of a measurement and checking device according to the invention, which has the form of a bridge which is disposed to be suspended under a motor vehicle between the vehicle wheels and, more precisely, to be suspended in a number of the measurement points with which vehicle chassis are normally provided. The bridge includes a central tube T which forms the frame of the bridge and, as in the embodiment shown in FIG. 1, is of circular cross section. The longitudinal axis of the tube T should, in the operative position of the bridge, lie in a plane which makes a reference plane (zero plane) for the measurement, that is to say a reference plane on which the x- and y-axis of the bridge are considered to be located. The chassis points which are to be measured can in general be supposed to be at least three on either side of the longitudinal axis, x-axis, of the bridge (the tube T), a disposition normal for private cars being two points with relatively small mutual spacing for the front suspension on either side and, at a relatively great distance therefrom, one point on either side for the rear suspension.

For checking and measurement of both points for each side of the front suspension, two cross beams A, M are provided. These are suitably in the form of U-profile beams with the flat web facing upwardly. The cross beams A and M can be identical and, in the illustrated embodiment, longitudinal slots A1 of even width are disposed in the webs close to both ends. Moreover, anchorage holes are provided in the central portion for brackets B and N, respectively, mounted about the central tube T. Furthermore, the beams are provided with measurement scales (as in MS6 in FIG. 6) suitably starting from the centre (the x-axis) and extending outwardly.

Two sleds, S, are disposed on each cross beam A, M and are guided by the beam, the sleds consisting of a base plate S1 and an upstanding sleeve S2 rigidly attached to the base plate. The sleeve penetrates the base plate S1 and is, on the underside, threaded for a locking nut (not shown), so that the sled may be tightened to the beam with the sleeve passing through the slot A1. The sleds S are provided with indexes S4 for reading-off the measuring scales on the beams. Furthermore, the device is provided with a rear cross beam R for checking and measurement of the rear chassis points. The rear cross beam is longer than the front cross beams A, M but is, otherwise, of the same design as them and is provided with a sled S on either side of the tube T together with associated measuring scales. The central tube T is provided with a rear bracket U which may be rigidly locked to the tube and may be tightened by means of screws to the central portion of the rear cross beam R.

A calibrated measurement rod S3 (FIG. 2) is associated with each one of the six sleds S and is insertable from above in the sleeve S2 and lockable therein by means of a clamping screw S5. Each sleeve S2 is provided with a slot for reading-off the measurement grade and an index (not shown), and each measurement rod S3 is terminated at the top by means of a semi-spherical knob S8 which is journalled in a pivot sleeve S6 to which is fixed the downwardly facing head of a screw S7. The screw S7 can be mounted and fixed in a checking point hole in the chassis. Such holes, or other checking points, in which screws, such as the screw S7, or equivalent fixing devices can be fixed are normally disposed on a majority of vehicle chassis. Thanks to the ball and socket suspension, it is always possible for the measurement rods to be adjusted perpendicular to the measurement plane (zero plane) represented by the plane of the measurement bridge. For the rear suspension, the screw S7 of the pivot sleeve S6 can be replaced by or supplemented with a device which permits suspension in a screw whose axis is horizontal. The reason for this is that the measurement points at the rear of the vehicle normally are of this form.

For mounting of the cross beams A, M, R on the central tube T, the beams are provided with similar brackets B, N, U, in which the tube T may be inserted.

Furthermore, the device may include a rectangular additional frame F, longitudinal grooves F1 being provided in the longer sides of the frame for accommodating screws, pins or the like fixed in the cross beams, and fixing devices F2. The frame is provided with an index scale (not shown) on one or both longitudinal sides for reading-off against the index on the beams A, M.

The principle involved in measuring, for example, the four forward chassis points, is as follows:

The chassis is mounted on trestles or supports with the checking points accessible. A measurement sleeve S2 with measurement rod S3 (released from the cross beams A, M, R of the bridge) are mounted in each chassis measurement point. The cross beam M is suspended by its two measurement rods, which have previously been set such that they are of equal length (this being checked on their measurement scales), and fixed. The cross beam M is adjusted such that its two sleds S are located equidistant from the centre point of the beam, which can be read-off on the measurement scales of the beam M. Keeping in mind the relationships between the mutual positions of the chassis points valid for the automobile model being tested (these as a rule being obtained from the dimensions and dimensional relationships valid for the automobile model), the beam A is then suspended in the leading chassis points (in the same manner as the beam M), whereafter the frame F is fixed at the rear beam M and its relationship to the leading beam A is observed. If the frame already at this point is in flatwise abutment against both the beam A and the beam M, the conclusion can be drawn that the mutual positional relationship of the chassis points in the yz- and xy-planes is correct. Otherwise, such flatwise abutment can be realized by shifting of the measurement rods S3 and sleds S, it being possible to read-off the size of the vertical deviation of one or more chassis points on the measurement rods, whereas a horizontal deviation is read-off by the distance of the sleds S from the centre point of the beam A.

The above-described procedure is particularly applied if there is reason to suppose that none of the forward chassis points has been bent from its position or if but minor damage has occurred. If the frontal section of the vehicle has been deformed to a greater extent, use may be made of the rear chassis points for the measuring process.

However, a check and measurement is first carried out as per the above. Thereafter, the sleds S and measurement rods S3 mounted on the rear cross beam R in the same way as on the beam M, are set at the correct width and height dimensions and the centre tube T is mounted on the central portion of the rear beam R by means of the bracket U. The tube T is locked in position in the bracket U with one index I1 on the bracket coinciding with a reference line T1 extending along the length of the tube and parallel to the axis of the tube. Thereafter, the leading brackets B, N are mounted on the tube, adjusted at the correct length dimension (read-off on the length scale T1 which extends along the tube) and locked in position on the tube by means of locking sleeves B2. The two forward brackets B, N can each consist of a plate B1 which, like the rear bracket U, has an index I2 and I3, respectively. The locking sleeves B2, rotatably and shiftably mounted on the tube T and co-operating with the brackets B, N are lockable by means of screws (not shown) and are preferably axially connected to the brackets.

If, after suspension of all cross beams A, M, R and placing of the tube T on these, the forward brackets A, M (placed in the correct measurement positions on the tube T) without misfit can be mounted with bolts AB and MB, respectively, anchored in the cross beams, and the brackets on planar abutment on the cross beams have their indexes I1, I2, I3 coinciding with the line T1, the positions of all six chassis measurement points are correct.

Another possibility for determining whether the chassis points are correctly located or for determining the degree of derangement is, after mounting of the bridge (with the tube) in the zero plane, to determine the deviations from the correct measurements on the measurement scales on the measurement rods (z-direction), on the cross beams (y-direction) and on the tube T (x-direction).

With the assistance of the index markings on the brackets B, N and their positions in relation to the reference line T1 on the tube T, it can thus be established if the forward chassis points lie at the correct height. If such is the case, the index markings lie on the reference line. If not, the beams A and M are set in such a manner as to obtain coincidence and the measurement rods are locked in position. The height dimensions can now be read-off on the scales of the measurement rods.

Apart from the above-described members and fittings, at least the rear cross beam R should, moreover, be provided, for example, on one flange, with an adjustable clinometer, for example an angularly adjustable spirit level, with a scale for reading-off in the yx-plane. In order that it be possible for such angular reading-off to take place also in the xz-plane, the cross beam R can be provided with a broadened central portion R1 in accordance with FIG. 3, on whose front side the above-mentioned spirit level R2 is mounted, whereas another spirit level for the xz-plane (not shown) is mounted at one side surface of the broadened central portion R1. Furthermore, the frame F can, on two opposing perpendicular sides, be provided with similar spirit levels for reading-off in the xz- and yz-planes. The spirit levels can be used for various checkings of buckling etc.

The measurement scale on the tube T can be a tape measure laid in a longitudinal groove for reading-off the adjustment position of the cross beams.

A sleeve V (FIG. 3) may be disposed on the tube T at a desired position along the longitudinal axis of the tube, the sleeve V being provided with an index V1 for twist-adjustment to the reference line T1 of the tube as shown in, FIG. 4. With the sleeve thus adjusted and locked in a suitable manner, for example, by means of a clamping screw, a telescope-like extension arm V2 departing from the sleeve will be directed downwardly. A wire V3 is fixed with at the lower end of the arm, a testing stud or measurement tip V4 being connected to the other end of the arm, and by means of which corresponding points on the chassis, located on either side of the longitudinal axis of the chassis, can be checked as regards symmetry. The detail V4 should be of short spacing between the wire anchorage and the tip and can be provided with a planar disk V5 just beneath the tip for facilitating the application of the stud at the correct spacing with respect to foraminated beams or the like.

A simple check of the length and width dimensions of the chassis points is made possible in that the brackets B, N and U are designed with guide sleeves B3 disposed at right angles to their axis, being either disposed coaxially, as per FIG. 5, or vertically above each other. Calibrated measurement rods B4 can be inserted into the guide sleeves and it is possible with the help of these measurement rods to establish in a simple manner the inclination of the associated beam and thereby to check deviations in the sled S and of the measurement points in the x- and y-directions, as shown in FIG. 5.

In FIG. 6 is shown a modified embodiment which differs from the embodiment in FIG. 1 substantially only in that the central tubular beam, that is to say the tube T, is replaced by a box beam T'. In this box beam T', a telescopically extendable member T'' can be disposed. On one of the cross beams A', M', R' serving as transverse measurement supports, there is mounted a clinometer C, for example in the form of a spirit level. The longitudinal beam T' may also support a clinometer (not shown). By means of the clinometer C (or several such clinometers) the horizontal position of the device according to the invention can be determined, and, by using a clinometer C which is adjustable in relation to a calibration (not shown) the device may be inclined at any desired angular position, which, for example, corresponds to a preset zero position (zero plane). By means of a calibration in the form of a longitudinal measurement scale MSa, the beam T' and the reference markings RM on the sliding blocks GK, by means of which the members A', M' R' are shiftably supported along the beam T', the positions thereof with respect to the beam T' can be determined. In a similar manner, the positions of the sleds S1a, S1b, S1c can be determined on the members A', M', R' with respect to the central longitudinal axis of the beam T'. All of the cross beams A', M', R' are, like the beam M', provided with a measurement scale MSb. The telescopically shiftable members S3, S3, S3 may also be adjusted and these adjustments can be read-off from the measurement scales MSc.

In FIG. 6 is also shown a support tripod P which can be used temporarily to facilitate suspension of the device under a vehicle chassis. If desired, the support tripod P can, naturally, be retained during the measurement process, in which case only the measurement scales at one end of the beam T' (the rear or forward) need be provided for suspension in measurement points in the chassis (not shown).

The above-described device may be used in many ways and for many types of checking and measurement apart from the above-exemplified. For optimum utilization it requires skillful handling. The possibilities which it offers in such an event can be said to be inherent in the device and dependent upon its nature described above and disclosed in the claims.

What I claim and desire to secure by Letters Patent is:

1. A checking and measurement device for a vehicle chassis, comprising, in combination:
    a central, longitudinal datum member adapted to be suspended in a longitudinal direction below a vehicle chassis to be checked and measured,
    a plurality of measurement scale carriers each comprising a rigid transversely extending measurement bar having a central portion and opposite end portions, said central and opposite end portions having a common axis,
    means for detachably and adjustably mounting each of said measurement bars at the central portion thereof on said central datum member with said end portions of said measurement bars extending in opposite, transversely extending directions from said central datum member in perpendicular relationship therewith, said mounting means being adapted for adjustable mounting of said measurement bars in longitudinal spaced positions along said central datum member in accordance with the spaced positions of measurement points in the vehicle chassis for measuring in the longitudinal direction thereof,
    a plurality of measurement rods on said measurement bars each having upper and lower ends,
    cooperating mounting means on the lower end of each of said measurement rods and on each end portion of each of said measurement bars for detachable and adjustable mounting of said lower end of said measurement rods on said end portions of said each measurement bar for selective adjustment therealong in accordance with the position of a corresponding measurement point in the vehicle chassis for measurement in the transverse direction thereof, each of said measurement rods having means for adjusting the length thereof,
    means on the upper end of each of said measurement rods for fixing and centering said measuring rod to a measurement point in the vehicle chassis in a suspended position,
    each of said measurement rods further having a universal joint means for permitting self-adjustment of said measurement rod in relation to the vertical when said rod is fixed at its upper end to said measurement point in the vehicle chassis and at its lower end to said measurement bar wherein said mounting means for mounting each of said measurement bars on said central datum member comprises a clamping means and means for securing said clamping means on a corresponding measurement bar and for clamping said clamping means on said datum member, said datum member having a longitudinal axis which forms a reference axis for a reference plane (zero plane) for measurement purposes, said datum member having a longitudinal reference line means and each of said clamping means having a reference mark for reading-off the angular position thereof relative to said datum member as well as the longitudinal position thereof along said datum member.

2. A checking and measuring device in accordance with claim 1, including a sled for supporting each of said measurement rods on its respective measurement bar, said sled being slidable along said bar and having locking means for locking said sled in selective positions along said bar, means for supporting the lower end of each of said measurement rods on a respective sled, said rod supporting means comprising a sleeve member and a rod member telescopically and adjustably received in said sleeve member, and means for locking said rod member in selective positions in relation to said sleeve member.

3. A checking and measurement device in accordance with claim 1, further including a frame, said frame having a pair of longitudinal members and scale means along at least one of said longitudinal members, at least one pair of said measurement bars having planar upper surfaces and said frame longitudinal members having planar lower surfaces for permitting planar positioning of said frame on two adjacent measurement bars, and means for fixedly locking said frame on said pair of measurement bars.

4. A checking and measurement device in accordance with claim 1, including an adjustable inclination indicator on said frame which may be read-off against the calibration for reading-off the inclination of said frame in two perpendicular planes.

5. A checking and measurement device in accordance with claim 1 including an angular adjustable inclination indicator on at least one of said measurement bars which may be read-off against the calibration for establishing the inclination of the arms in two perpendicular planes.

* * * * *